United States Patent
Lin

(10) Patent No.: US 12,158,192 B2
(45) Date of Patent: Dec. 3, 2024

(54) FLEXIBLE PULLING ROPE AND MANUFACTURING METHOD THEREOF

(71) Applicant: Zhenghong Lin, Shanghai (CN)

(72) Inventor: Zhenghong Lin, Shanghai (CN)

(73) Assignee: SHANGHAI JINLI SPECIAL ROPE CO., LTD., Shanghai (CN)

( * ) Notice: Subject to any disclaimer, the term of this patent is extended or adjusted under 35 U.S.C. 154(b) by 0 days.

(21) Appl. No.: 18/638,793

(22) Filed: Apr. 18, 2024

(65) Prior Publication Data

US 2024/0263682 A1 Aug. 8, 2024

(51) Int. Cl.
  *F16G 11/14* (2006.01)
  *B66C 1/12* (2006.01)
  *D07B 1/16* (2006.01)
  *D07B 1/18* (2006.01)

(52) U.S. Cl.
  CPC .............. *F16G 11/14* (2013.01); *B66C 1/122* (2013.01); *D07B 1/162* (2013.01); *D07B 1/18* (2013.01); *D07B 2205/201* (2013.01)

(58) Field of Classification Search
  CPC ......... F16G 11/14; B66C 1/122; D07B 1/162; D07B 1/18; D07B 2205/201
  See application file for complete search history.

(56) References Cited

U.S. PATENT DOCUMENTS

| | | | | |
|---|---|---|---|---|
| 3,457,717 A * | 7/1969 | Wall | ....................... | D07B 1/162 57/210 |
| 3,718,945 A * | 3/1973 | Brindejonc de Treglode | .............. | B29C 70/58 24/370 |
| 4,093,292 A * | 6/1978 | Marcet | ...................... | B66C 1/12 294/74 |
| 4,258,608 A * | 3/1981 | Brown | ...................... | D07B 1/18 87/2 |
| 5,018,775 A * | 5/1991 | McKenna | ................. | D07B 1/18 294/82.11 |
| 5,727,833 A * | 3/1998 | Coe | ........................... | B66C 1/12 73/862.56 |
| 2014/0097554 A1 * | 4/2014 | Fenton | .................. | B29C 65/542 264/261 |
| 2015/0267347 A1 * | 9/2015 | Farmer | ................... | B66C 1/122 87/7 |
| 2022/0307196 A1 * | 9/2022 | Nicholson | ............... | F16G 15/06 |

* cited by examiner

*Primary Examiner* — Stephen A Vu

(57) ABSTRACT

A flexible pulling rope includes a main rope body and a main rope sleeve. The main rope body is formed by connecting a rope from head to tail. The main rope body includes a connecting part formed by two parallel ropes and two pulling parts located at two ends of the connecting part. The main rope sleeve sleeves the connecting part. Two ends of the main rope sleeve are respectively connected to two ends of the connecting part. A method for manufacturing a flexible pulling rope is also provided. By the arrangement of the above structure, the two ends of the main rope sleeve are respectively connected to the two ends of the connecting part. This can not only form a whole by the connecting part and the main rope sleeve, improve the strength of the product, and make the product bear higher loads when pulling heavy objects.

16 Claims, 3 Drawing Sheets

FLEXIBLE PULLING ROPE AND MANUFACTURING METHOD THEREOF

TECHNICAL FIELD

The present disclosure relates to the technical field of pulling devices, and in particular, to a flexible pulling rope and a manufacturing method thereof.

BACKGROUND OF THE INVENTION

In the fields of fishery, mining, animal husbandry, and the like, a winch is usually used to lift and drag heavy objects. A steel wire rope is generally used for lifting in the winch. The steel wire rope has high strength and rigidity and can lift the heavy objects. However, when the steel wire rope is accidentally broken, the broken steel wire rope may easily rebound due to its high rebound force, and may damage an object. Especially when the steel wire rope rebounds onto the body of a worker, serious safety accidents may be caused.

In order to solve the above problems, the present disclosure provides a flexible pulling rope made of macromolecular polymer fibers, which has softness, high pulling strength, and small rebound force, and is safer to use.

SUMMARY OF THE INVENTION

In order to overcome the deficiencies in the prior art, the present disclosure provides a flexible pulling rope, a main body of which is soft, has high pulling strength and small rebound force, and is safer to use.

The technical solution adopted by the present disclosure to solve the technical problem is as follows.

A flexible pulling rope includes:
  a main rope body, wherein the main rope body is formed by connecting a rope from head to tail, and the main rope body includes a connecting part formed by two parallel ropes and two pulling parts located at two ends of the connecting part; and
  a main rope sleeve, wherein the main rope sleeve sleeves the connecting part, and two ends of the main rope sleeve are respectively connected to two ends of the connecting part.

As the improvement of the present disclosure, the flexible pulling rope further includes a first adhesive tape layer, wherein the first adhesive tape layer is wound on an outer surface of a connecting end of the connecting part and an outer surface of a connecting end of the main rope sleeve.

As the improvement of the present disclosure, the flexible pulling rope further includes a connecting rope, wherein the connecting rope is wound and connected to the outer surface of the connecting end of the connecting part, an outer surface of the first adhesive tape layer, and the outer surface of the connecting end of the main rope sleeve.

As the improvement of the present disclosure, the flexible pulling rope further includes pulling rope sleeves, wherein the pulling rope sleeves sleeve the pulling parts.

As the improvement of the present disclosure, the flexible pulling rope further includes a second adhesive tape layer, wherein the second adhesive tape layer is wound on outer surfaces of end portions of the pulling rope sleeves and outer surfaces of portions of the pulling parts.

As the improvement of the present disclosure, the flexible pulling rope further includes a plastic layer, wherein the plastic layer is wrapped on an outer surface of the second adhesive tape layer, the outer surfaces of the end portions of the pulling rope sleeves, and the outer surfaces of the portions of the pulling parts.

As the improvement of the present disclosure, the flexible pulling rope further includes a protective sleeve, wherein the protective sleeve sleeves the main rope sleeve.

As the improvement of the present disclosure, the protective sleeve includes a sheet material and two hook and loop fasteners, wherein the two hook and loop fasteners are respectively connected to two side edges of the sheet material; and the two hook and loop fasteners are detachably connected to each other to form the sheet material into the cylindrical protective sleeve.

As the improvement of the present disclosure, the two hook and loop fasteners are respectively arranged on an upper surface or a lower surface of the sheet material, and extend from an upper end of the sheet material to a lower end of the sheet material.

As the improvement of the present disclosure, the main rope body, the main rope sleeve, the connecting rope, the pulling rope sleeve, and the protective sleeve are made of polyethylene fibers with an ultra-high molecular weight.

The present disclosure also provides a method for manufacturing a flexible pulling rope, including:
  connecting a rope from head to tail to form a main rope body, wherein the main rope body includes a connecting part formed by two parallel ropes and two pulling parts located at two ends of the connecting part; and
  providing a main rope sleeve, sleeving the connecting part by the main rope sleeve, and respectively connecting two ends of the main rope sleeve to two ends of the connecting part.

As the improvement of the present disclosure, the method for manufacturing the flexible pulling rope further includes: providing a first adhesive tape layer, and winding the first adhesive tape layer on an outer surface of a connecting end of the connecting part and an outer surface of a connecting end of the main rope sleeve.

As the improvement of the present disclosure, the method for manufacturing the flexible pulling rope further includes: providing a connecting rope, and winding and connecting the connecting rope to the outer surface of the connecting end of the connecting part, an outer surface of the first adhesive tape layer, and the outer surface of the connecting end of the main rope sleeve.

As the improvement of the present disclosure, the method for manufacturing the flexible pulling rope further includes: providing two pulling rope sleeves before the connecting a rope from head to tail to form a main rope body, and sleeving the pulling parts by the pulling rope sleeves.

As the improvement of the present disclosure, an adhesive tape is used to be wound on outer surfaces of end portions of the pulling rope sleeves and outer surfaces of portions of the pulling parts to form a second adhesive tape layer.

As the improvement of the present disclosure, an outer surface of the second adhesive tape layer, the outer surfaces of the end portions of the pulling rope sleeves, and the outer surfaces of the portions of the pulling parts are coated with plastic to form a plastic layer.

As the improvement of the present disclosure, the method for manufacturing the flexible pulling rope further includes: providing a protective sleeve, and sleeving the main rope sleeve with the protective sleeve.

As the improvement of the present disclosure, the protective sleeve includes a sheet material and two hook and loop fasteners, wherein the two hook and loop fasteners are respectively connected to two side edges of the sheet material; and the two hook and loop fasteners are detachably connected to each other to form the sheet material into the cylindrical protective sleeve.

As the improvement of the present disclosure, the two hook and loop fasteners are respectively arranged on an upper surface or a lower surface of the sheet material, and extend from an upper end of the sheet material to a lower end of the sheet material.

As the improvement of the present disclosure, the main rope body, the main rope sleeve, the connecting rope, the pulling rope sleeves, and the protective sleeve are made of polyethylene fibers with an ultra-high molecular weight.

The present disclosure has the following beneficial effects. By the arrangement of the above structure, the two ends of the main rope sleeve are respectively connected to the two ends of the connecting part. This can not only form a whole by the connecting part and the main rope sleeve, improve the strength of the product, and make the product bear higher loads when pulling heavy objects, but also use the main rope sleeve to protect the connecting part and prevent damage to the connecting part. The two pulling parts can allow a user to more conveniently connect the pulling rope to an output end of equipment such as a crane and a winch, so as to facilitate use. Meanwhile, the main rope body and the main rope sleeve are both made of a macromolecular polymer fiber which has high tensile strength, lower resilience, and higher safety in use.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Figure 1:
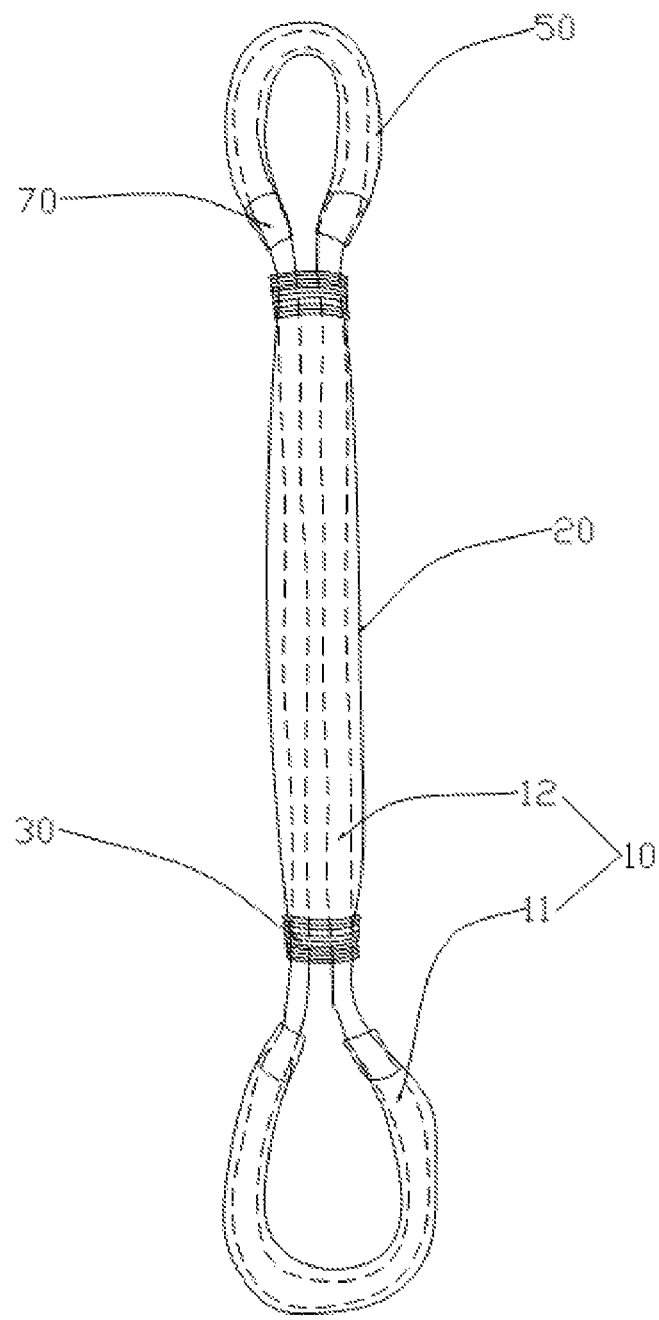
FIG. 1 is a schematic diagram of an entire structure of a pulling rope of the present disclosure.
Figure 2:
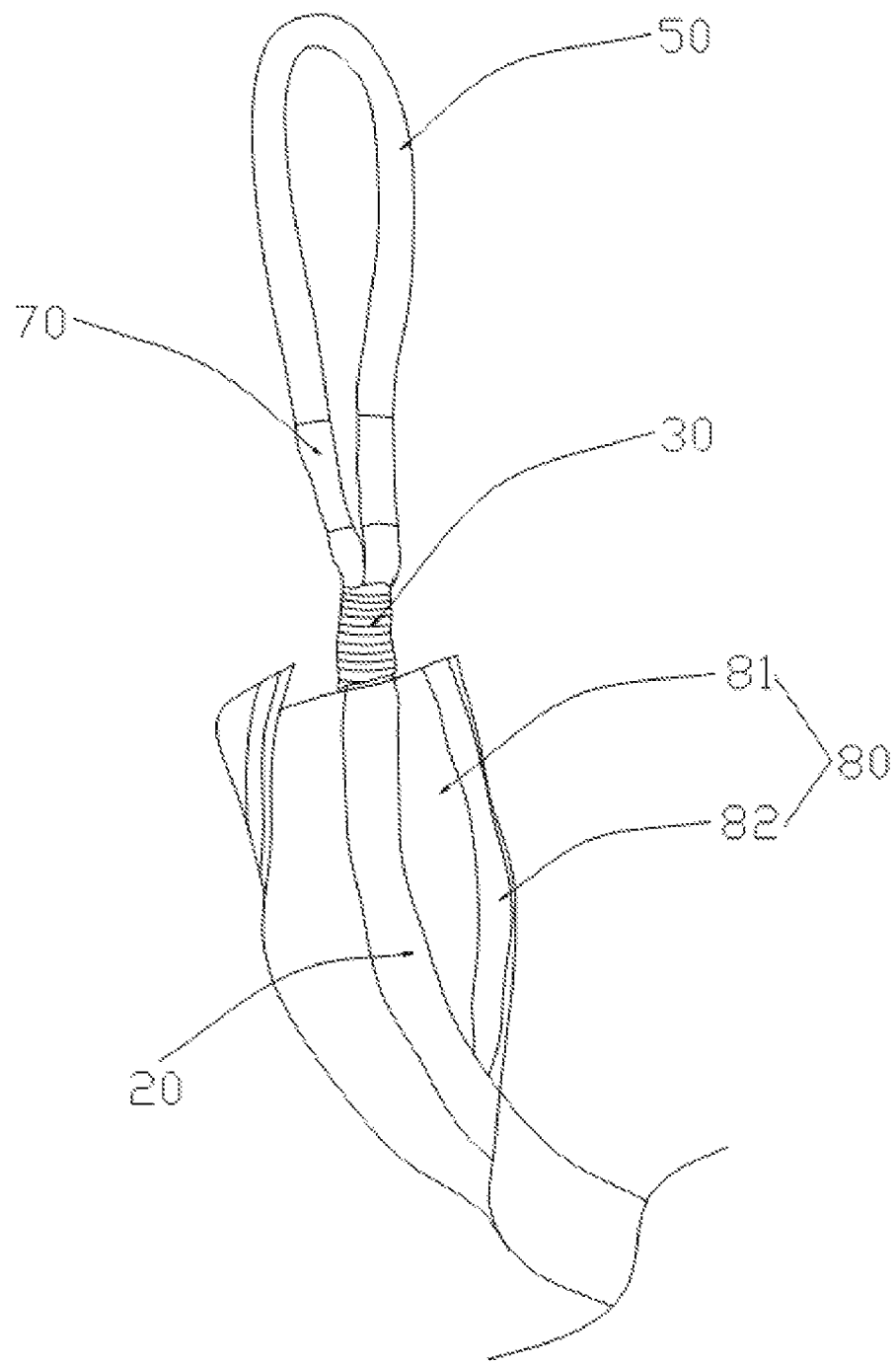
FIG. 2 is a schematic diagram of a partial structure of a pulling rope of the present disclosure.
Figure 3:
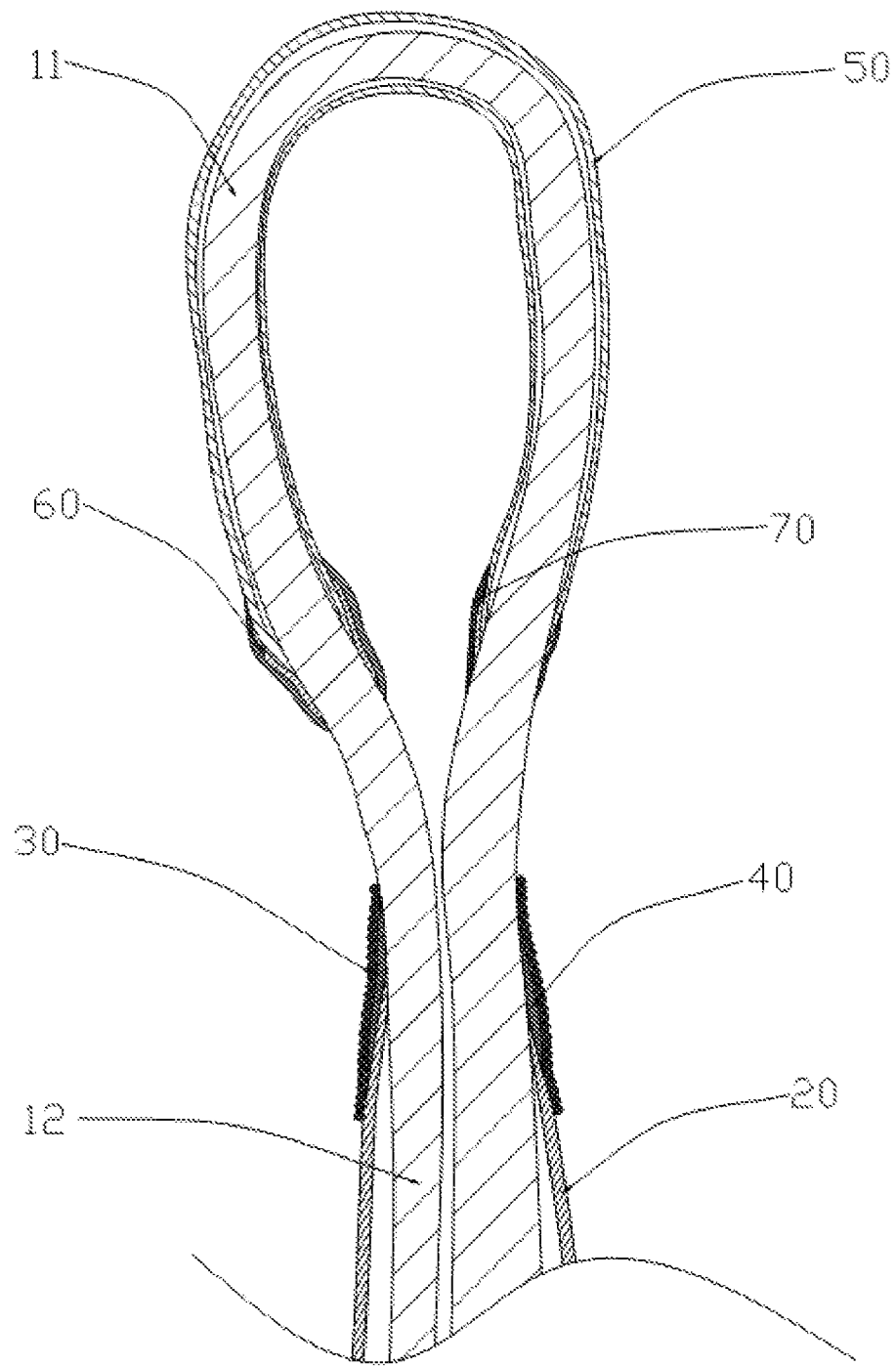
FIG. 3 is a schematic diagram of a partially cross-sectional structure of a pulling rope of the present disclosure.

Referring to FIG. 1 to FIG. 3, a flexible pulling rope includes:
a main rope body 10, wherein the main rope body 10 is formed by connecting a rope from head to tail, and the main rope body 10 includes a connecting part 11 formed by two parallel ropes and two pulling parts 12 located at two ends of the connecting part 11; and
a main rope sleeve 20, wherein the main rope sleeve 20 sleeves the connecting part 11, and two ends of the main rope sleeve 20 are respectively connected to two ends of the connecting part 11.

By the arrangement of the above structure, the two ends of the main rope sleeve 20 are respectively connected to the two ends of the connecting part 11. This can not only form a whole by the connecting part 11 and the main rope sleeve 20, improve the strength of the product, and make the product bear higher loads when pulling heavy objects, but also use the main rope sleeve 20 to protect the connecting part 11 and prevent damage to the connecting part. The two pulling parts 12 can allow a user to more conveniently connect the pulling rope to an output end of equipment such as a crane and a winch, so as to facilitate use. Meanwhile, the main rope body 10 and the main rope sleeve 20 are both made of a macromolecular polymer fiber which has high tensile strength, lower resilience, and higher safety in use. Preferably, the main rope body 10 is woven from 12 strands of high-strength fibers, and the main rope sleeve 20 is woven from 32 strands of high-strength fibers.

In this embodiment, the flexible pulling rope further includes a first adhesive tape layer 40, wherein the first adhesive tape layer 40 is wound on an outer surface of a connecting end of the connecting part 11 and an outer surface of a connecting end of the main rope sleeve 20. By the arrangement of the above structure, the first adhesive tape layer 40 is wound at an end portion of the connecting part 11 and an end portion of the main rope sleeve 20, which can compress the main rope sleeve to a surface of the connecting part 11, increase the static friction force between the main rope sleeve and the connecting part, improve the connection strength, and improve the stability of the product. Meanwhile, the first adhesive tape layer 40 can also provide adhesion to further stably connect the connecting part 11 to the main rope sleeve 20. Furthermore, using the first adhesive tape layer 40 is also more convenient for operation, which improves the production efficiency of the product. Moreover, the first adhesive tape layer 40 can also hinder the relative sliding between the connecting part 11 and the main rope sleeve 20 to prevent wear and tear caused by sliding between the connecting part and the main rope sleeve.

In this embodiment, the flexible pulling rope further includes a connecting rope 30; the connecting rope 30 is wound and connected to the outer surface of the connecting end of the connecting part 11, an outer surface of the first adhesive tape layer 40, and the outer surface of the connecting end of the main rope sleeve 20. By the arrangement of the above structure, the connecting rope 30 is wound and connected to the end portion of the connecting part 11, the end portion of the main rope sleeve 20, and the outer surface of the first adhesive tape layer 40, so as to further tighten joints and increase pressures between the connecting part 11, the main rope sleeve 20, and the first adhesive tape layer 40, thereby improving the friction force and the connection strength. Moreover, the connecting rope 30 is wound and wrapped on the outer surface of the first adhesive tape layer 40, which can effectively protect the first adhesive tape layer 40 and prolong the service life of the product.

In this embodiment, the flexible pulling rope further includes pulling rope sleeves 50, wherein the pulling rope sleeves 50 sleeve the pulling parts 12. By the arrangement of the above structure, the pulling rope sleeves 50 sleeve the pulling parts 12, which can improve the strength at the pulling parts 12, reduce the wear on the pulling parts 12, and prolong the service life of the product. Meanwhile, the pulling rope sleeves 50 can use a material with a high surface friction coefficient, which can increase the friction forces at the pulling parts 12 and further improve the stability of connection between the pulling parts 12 and pulling equipment. Preferably, each pulling rope sleeve 50 is woven from 24 strands of high-strength fibers.

In this embodiment, the flexible pulling rope further includes a second adhesive tape layer 60, wherein the second adhesive tape layer 60 is wound on outer surfaces of end portions of the pulling rope sleeves 50 and outer surfaces of portions of the pulling parts 12. By the arrangement of the above structure, the second adhesive tape layer 60 can be used to fix the pulling rope sleeves 50 and the pulling parts 12 to hinder the relative sliding between the pulling rope sleeves and the pulling parts and prevent wear and tear. In addition, the connection strength between the pulling rope sleeves and the pulling parts can be improved, and the service life of the product can be prolonged.

In this embodiment, the flexible pulling rope further includes a plastic layer 70; and the plastic layer 70 is wrapped on an outer surface of the second adhesive tape layer 60, the outer surfaces of the end portions of the pulling rope sleeves 50, and the outer surfaces of the portions of the pulling parts 12. By the arrangement of the above structure, the plastic layer 70 is used to be wrapped on the second adhesive tape layer 60, the end portions of the pulling rope sleeves 50, and the outer surfaces of the portions of the pulling parts 12. This can further improve the connection strength between the pulling rope sleeves 50 and the pulling parts 12, and also protect the second adhesive tape layer 60 to prevent the second adhesive tape layer 60 from being aged and damaged.

In this embodiment, the flexible pulling rope further includes a protective sleeve 80; and the protective sleeve 80 sleeves the main rope sleeve 20. By the arrangement of the above structure, the protective sleeve 80 can protect the main rope sleeve 20 to prevent the main rope sleeve 20 from being polluted and corroded, and prolong the service life of the product. Furthermore, when the protective sleeve 80 is damaged, the protective sleeve 80 can also be conveniently replaced to save the costs.

In this embodiment, the protective sleeve includes a sheet material 81 and two hook and loop fasteners 82; the two hook and loop fasteners 82 are respectively connected to two side edges of the sheet material; and the two hook and loop fasteners 82 are detachably connected to each other to form the sheet material 81 into the cylindrical protective sleeve 80. By the arrangement of the above structure, the two hook and loop fasteners 82 are connected to each other, and the sheet material 81 can be curled into the cylindrical protective sleeve 80, which is convenient to use and easy to operate.

In this embodiment, the two hook and loop fasteners 82 are respectively arranged on an upper surface or a lower surface of the sheet material 81, and extend from an upper end of the sheet material 81 to a lower end of the sheet material 81. By the arrangement of the above structure, the two hook and loop fasteners are respectively located on the upper surface and the lower surface of the sheet material 81. When the sheet material 81 is curled, it is easier to connect the two hook and loop fasteners 82 to each other, facilitating the operation by the user. Furthermore, the cylindrical protective sleeve 80 formed has a smooth surface and is aesthetically pleasing.

In this embodiment, the main rope body 10, the main rope sleeve 20, the connecting rope 30, the pulling rope sleeves 50, and the protective sleeve 80 are made of polyethylene fibers with an ultra-high molecular weight. By the arrangement of the above structure, the polyethylene fibers with the ultra-high molecular weight have a small density less than 1. Under the same tensile strength, the weight of the polyethylene fibers is only about one eighth of that of a steel cable, making the product lighter in weight. Furthermore, the tensile strength is high. With the same diameter, the polyethylene fibers have the strength close to that of the steel cable. Moreover, the polyethylene fibers also have low elasticity, so that the pulling rope rebounds little if it is broken, which can effectively reduce the safety accidents caused by the breakage of the pulling rope.

Referring to FIG. 1 to FIG. 3, a method for manufacturing a flexible pulling rope includes:

A rope is connected from head to tail to form a main rope body 10, wherein the main rope body 10 includes a connecting part 11 formed by two parallel ropes and two pulling parts 12 located at two ends of the connecting part 11; and a main rope sleeve 20 is provided; the connecting part 11 is sleeved by the main rope sleeve 20; and two ends of the main rope sleeve 20 are respectively connected to two ends of the connecting part 11.

By the arrangement of the above structure, the two ends of the main rope sleeve 20 are respectively connected to the two ends of the connecting part 11. This can not only form a whole by the connecting part 11 and the main rope sleeve 20, improve the strength of the product, and make the product bear higher loads when pulling heavy objects, but also use the main rope sleeve 20 to protect the connecting part 11 and prevent damage to the connecting part. The two pulling parts 12 can allow a user to more conveniently connect the pulling rope to an output end of equipment such as a crane and a winch, so as to facilitate use. Meanwhile, the main rope body 10 and the main rope sleeve 20 are both made of a macromolecular polymer fiber which has high tensile strength, lower resilience, and higher safety in use. Preferably, the main rope body 10 is woven from 12 strands of high-strength fibers, and the main rope sleeve 20 is woven from 32 strands of high-strength fibers.

In this embodiment, a first adhesive tape layer 40 is provided; and the first adhesive tape layer 40 is wound on an outer surface of a connecting end of the connecting part 11 and an outer surface of a connecting end of the main rope sleeve 20. By the arrangement of the above structure, the first adhesive tape layer 40 is wound at an end portion of the connecting part 11 and an end portion of the main rope sleeve 20, which can compress the main rope sleeve to a surface of the connecting part 11, increase the static friction force between the main rope sleeve and the connecting part, improve the connection strength, and improve the stability of the product. Meanwhile, the first adhesive tape layer 40 can also provide adhesion to further stably connect the connecting part 11 to the main rope sleeve 20. Furthermore, using the first adhesive tape layer 40 is also more convenient for operation, which improves the production efficiency of the product. Moreover, the first adhesive tape layer 40 can also hinder the relative sliding between the connecting part 11 and the main rope sleeve 20 to prevent wear and tear caused by sliding between the connecting part and the main rope sleeve.

In this embodiment, a connecting rope 30 is provided; and the connecting rope 30 is wound and connected to the outer surface of the connecting end of the connecting part 11, an outer surface of the first adhesive tape layer 40, and the outer surface of the connecting end of the main rope sleeve 20. By the arrangement of the above structure, the connecting rope 30 is wound and connected to the end portion of the connecting part 11, the end portion of the main rope sleeve 20, and the outer surface of the first adhesive tape layer 40, so as to further tighten joints and increase pressures between the connecting part 11, the main rope sleeve 20, and the first adhesive tape layer 40, thereby improving the friction force and the connection strength. Moreover, the connecting rope 30 is wound and wrapped on the outer surface of the first adhesive tape layer 40, which can effectively protect the first adhesive tape layer 40 and prolong the service life of the product.

In this embodiment, two pulling rope sleeves 50 are provided before a rope is connected from head to tail to form a main rope body 10, and the pulling parts 12 are sleeved by the pulling rope sleeves 50. By the arrangement of the above structure, before a rope is connected from head to tail to form a main rope body 10, the pulling rope sleeves 50 sleeve the pulling parts 12, which can simplify the production flow and facilitate the mounting of the pulling rope sleeves 50. The pulling rope sleeves 50 can improve the strength at the pulling parts 12, reduce the wear on the pulling parts 12, and prolong the service life of the product. Meanwhile, the pulling rope sleeves 50 can use a material with a high surface friction coefficient, which can increase the friction forces at the pulling parts 12 and further improve the stability of connection between the pulling parts 12 and pulling equipment. Preferably, each pulling rope sleeve 50 is woven from 24 strands of high-strength fibers.

In his embodiment, an adhesive tape is used to be wound on outer surfaces of end portions of the pulling rope sleeves 50 and outer surfaces of portions of the pulling parts 12 to form a second adhesive tape layer 60. By the arrangement of the above structure, the second adhesive tape layer 60 is connected to the end portions of the pulling rope sleeves 50 and the portions of the pulling parts 12, so that the operation is simple. The pulling rope sleeves 50 and the pulling parts 12 can be fixed to hinder the relative sliding between the pulling rope sleeves and the pulling parts and prevent wear and tear. In addition, the connection strength between the pulling rope sleeves and the pulling parts can be improved, and the service life of the product can be prolonged.

In this embodiment, an outer surface of the second adhesive tape layer 60, the outer surfaces of the end portions of the pulling rope sleeves 50, and the outer surfaces of the portions of the pulling parts 12 are coated with plastic to form a plastic layer 70. By the arrangement of the above structure, the surface of the second adhesive tape layer 60, the end portions of the pulling rope sleeves 50, and the outer surfaces of the portions of the pulling parts 12 are coated with the plastic. This can further improve the connection strength between the pulling rope sleeves 50 and the pulling parts 12, and also protect the second adhesive tape layer 60 to prevent the second adhesive tape layer 60 from being aged and damaged.

In this embodiment, a protective sleeve 80 is provided; and the protective sleeve 80 sleeves the main rope sleeve 20. By the arrangement of the above structure, the protective sleeve 80 sleeves the main rope sleeve 20, which can protect the main rope sleeve 20 to prevent the main rope sleeve 20 from being polluted and corroded, and prolong the service life of the product. Furthermore, when the protective sleeve 80 is damaged, the protective sleeve 80 can also be conveniently replaced to save the costs.

In this embodiment, the protective sleeve includes a sheet material 81 and two hook and loop fasteners 82; the two hook and loop fasteners 82 are respectively connected to two side edges of the sheet material; and the two hook and loop fasteners 82 are detachably connected to each other to form the sheet material 81 into the cylindrical protective sleeve 80. By the arrangement of the above structure, the two hook and loop fasteners 82 are used to be connected to each other, and the sheet material 81 can be curled into the cylindrical protective sleeve 80, which is convenient to use and easy to operate.

In this embodiment, the two hook and loop fasteners 82 are respectively arranged on an upper surface or a lower surface of the sheet material 81, and extend from an upper end of the sheet material 81 to a lower end of the sheet material 81. By the arrangement of the above structure, the two hook and loop fasteners are respectively arranged on the upper surface and the lower surface of the sheet material 81. When the sheet material 81 is curled, it is easier to connect the two hook and loop fasteners 82 to each other, facilitating the operation by the user. Furthermore, the cylindrical protective sleeve 80 formed has a smooth surface and is aesthetically pleasing.

In this embodiment, the main rope body 10, the main rope sleeve 20, the connecting rope 30, the pulling rope sleeves 50, and the protective sleeve 80 are made of polyethylene fibers with an ultra-high molecular weight. By the arrangement of the above structure, the polyethylene fibers with the ultra-high molecular weight have a small density less than 1. Under the same tensile strength, the weight of the polyethylene fibers is only about one eighth of that of a steel cable, making the product lighter in weight. Furthermore, the tensile strength is high. With the same diameter, the polyethylene fibers have the strength close to that of the steel cable. Moreover, the polyethylene fibers also have low elasticity, so that the pulling rope rebounds little if it is broken, which can effectively reduce the safety accidents caused by the breakage of the pulling rope.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

The invention claimed is:

1. A flexible pulling rope, comprising:
    a main rope body, wherein the main rope body is formed by connecting a rope from head to tail, and the main rope body comprises a connecting part formed by two parallel ropes and two pulling parts located at two ends of the connecting part;
    a main rope sleeve, wherein the main rope sleeve sleeves the connecting part, and two ends of the main rope sleeve are respectively connected to two ends of the connecting part;
    a first adhesive tape layer, wherein the first adhesive tape layer is wound on an outer surface of a connecting end of the connecting part and an outer surface of a connecting end of the main rope sleeve; and
    a connecting rope, wherein the connecting rope is wound and connected to the outer surface of the connecting end of the connecting part, an outer surface of the first adhesive tape layer, and the outer surface of the connecting end of the main rope sleeve.

2. The flexible pulling rope according to claim 1, further comprising pulling rope sleeves, wherein the pulling rope sleeves sleeve the pulling parts.

3. The flexible pulling rope according to claim 2, further comprising a second adhesive tape layer, wherein the second adhesive tape layer is wound on outer surfaces of end portions of the pulling rope sleeves and outer surfaces of portions of the pulling parts.

4. The flexible pulling rope according to claim 3, further comprising a plastic layer, wherein the plastic layer is wrapped on an outer surface of the second adhesive tape layer, the outer surfaces of the end portions of the pulling rope sleeves, and the outer surfaces of the portions of the pulling parts.

5. The flexible pulling rope according to claim 2, further comprising a protective sleeve, wherein the protective sleeve sleeves the main rope sleeve.

6. The flexible pulling rope according to claim 5, wherein the protective sleeve comprises a sheet material and two hook and loop fasteners, wherein the two hook and loop fasteners are respectively connected to two side edges of the sheet material; and the two hook and loop fasteners are detachably connected to each other to form the sheet material into the cylindrical protective sleeve.

7. The flexible pulling rope according to claim 6, wherein the two hook and loop fasteners are respectively arranged on an upper surface or a lower surface of the sheet material, and extend from an upper end of the sheet material to a lower end of the sheet material.

8. The flexible pulling rope according to claim 5, wherein the main rope body, the main rope sleeve, the connecting rope, the pulling rope sleeve, and the protective sleeve are made of polyethylene fibers with an ultra-high molecular weight.

9. A method for manufacturing a flexible pulling rope, comprising:
   connecting a rope from head to tail to form a main rope body, wherein the main rope body comprises a connecting part formed by two parallel ropes and two pulling parts located at two ends of the connecting part;
   providing a main rope sleeve, sleeving the connecting part by the main rope sleeve, and respectively connecting two ends of the main rope sleeve to two ends of the connecting part;
   providing a first adhesive tape layer, and winding the first adhesive tape layer on an outer surface of a connecting end of the connecting part and an outer surface of a connecting end of the main rope sleeve; and
   providing a connecting rope, and winding and connecting the connecting rope to the outer surface of the connecting end of the connecting part, an outer surface of the first adhesive tape layer, and the outer surface of the connecting end of the main rope sleeve.

10. The method for manufacturing the flexible pulling rope according to claim 9, further comprising: providing two pulling rope sleeves before the connecting a rope from head to tail to form a main rope body, and sleeving the pulling parts by the pulling rope sleeves.

11. The method for manufacturing the flexible pulling rope according to claim 10, wherein an adhesive tape is used to be wound on outer surfaces of end portions of the pulling rope sleeves and outer surfaces of portions of the pulling parts to form a second adhesive tape layer.

12. The method for manufacturing the flexible pulling rope according to claim 11, wherein an outer surface of the second adhesive tape layer, the outer surfaces of the end portions of the pulling rope sleeves, and the outer surfaces of the portions of the pulling parts are coated with plastic to form a plastic layer.

13. The method for manufacturing the flexible pulling rope according to claim 10, further comprising: providing a protective sleeve, and sleeving the main rope sleeve with the protective sleeve.

14. The method for manufacturing the flexible pulling rope according to claim 13, wherein the protective sleeve comprises a sheet material and two hook and loop fasteners, wherein the two hook and loop fasteners are respectively connected to two side edges of the sheet material; and the two hook and loop fasteners are detachably connected to each other to form the sheet material into the cylindrical protective sleeve.

15. The method for manufacturing the flexible pulling rope according to claim 14, wherein the two hook and loop fasteners are respectively arranged on an upper surface or a lower surface of the sheet material, and extend from an upper end of the sheet material to a lower end of the sheet material.

16. The method for manufacturing the flexible pulling rope according to claim 13, wherein the main rope body, the main rope sleeve, the connecting rope, the pulling rope sleeves, and the protective sleeve are made of polyethylene fibers with an ultra-high molecular weight.

* * * * *